United States Patent [19]

Montgomery, Jr. et al.

[11] Patent Number: 4,775,226
[45] Date of Patent: Oct. 4, 1988

[54] METHOD TO CREATE MEMORY IN A DISPERSED SMECTIC SYSTEM

[75] Inventors: George P. Montgomery, Jr., Troy; Nuno A. Vaz, West Bloomfield, both of Mich.

[73] Assignee: General Motors Corporation, Detroit, Mich.

[21] Appl. No.: 880,009

[22] Filed: Jun. 30, 1986

[51] Int. Cl.$^4$ ............................................. G02F 1/137
[52] U.S. Cl. .................................. 350/350 S; 350/351
[58] Field of Search .................... 350/350 S, 351, 334, 350/349

[56] References Cited

U.S. PATENT DOCUMENTS

| | | | |
|---|---|---|---|
| 3,600,060 | 2/1968 | Churchill et al. | 350/351 X |
| 3,796,999 | 3/1974 | Kahn | 350/351 X |
| 4,435,047 | 3/1984 | Fergason | 350/334 |
| 4,556,289 | 12/1985 | Fergason | 350/349 |

Primary Examiner—John S. Heyman
Assistant Examiner—David Lewis
Attorney, Agent, or Firm—Randy W. Tung

[57] ABSTRACT

A method of creating memory effect in an optically responsive film containing smectic liquid crystal microdroplets dispersed in a polymeric film by first heating it to a higher temperature such that the structure of the liquid crystal is transformed into an isotropic phase, and then cooling the liquid crystal from that higher temperature in an electric field of sufficient intensity such that the liquid crystal microdroplets remain in an aligned state of the smectic phase for a sufficiently long period of time.

1 Claim, 1 Drawing Sheet

METHOD TO CREATE MEMORY IN A DISPERSED SMECTIC SYSTEM

FIELD OF THE INVENTION

The present invention generally relates to a method of creating memory effect in an optically responsive film containing smectic liquid crystal microdroplets dispersed in a polymeric film and, more particularly, is concerned with a method of creating memory effect in an optically responsive film containing smectic liquid crystal microdroplets dispersed in a polymeric film by first heating it to a higher temperature such that the structure of the liquid crystal is transformed into an isotropic phase, and then cooling the liquid crystal from said higher temperature in an electric field of sufficient intensity such that the liquid crystal microdroplets remain in an aligned state of the smectic phase for a sufficiently long period of time.

BACKGROUND OF THE INVENTION

In recent years, dispersed microdroplet liquid crystal systems have been developed. In a dispersed microdroplet liquid crystal system, a liquid crystal material and a liquid polymer precursor are mixed together and then the mixture cast into a film. The polymer precursor material which constitutes the matrix of the film is allowed to react and to cure. The resulting product is a polymeric film that contains dispersed therein many small droplets (also called microdroplets) of liquid crystal material. The nature of the liquid crystal material and the temperature of the film determine the light transparency of the film. It may be opaque or transparent at room temperature. The liquid crystal film used in the present invention is opaque at room temperature. When the film is heated, the heated portions of the film become transparent.

Liquid crystal films previously made by the dispersion technique do not have memory, i.e., they revert to their scattering (or opaque) state as soon as the voltage is removed in the case of nematic materials or the temperature is decreased in general. In many applications, it is desirable for the liquid crystal film to have memory such that the occurrence of a specific event may be recorded. For instance, in large area windows using these films to control light transmittance, the power consumption could be reduced if the film had memory since power could be removed once the film has been converted to its transparent state. Memory would also be an important safety feature in such an application since a window would remain transparent in the event of a power failure. Memory can also be used to simplify addressing in liquid crystal displays in large areas. The word addressing is commonly used to describe the process of converting a specific portion of a liquid crystal from one optical state to another optical state. Furthermore, memory effect is essential in the construction of a liquid crystal device to record maximum temperatures.

It is therefore an object of the present invention to provide a method of creating memory in an optically responsive film by using liquid crystal microdroplets having molecules arranged in a smectic structure dispersed in a polymeric film.

It is another object of the present invention to provide a method of creating memory effect in an optically responsive film by using liquid crystal microdroplets having molecules arranged in a smectic structure dispersed in a polymeric film which can be performed in a convenient and economical way.

SUMMARY OF THE INVENTION

In accordance with a preferred practice of our invention, a method of creating memory effect in an optically responsive film containing liquid crystal microdroplets having molecules arranged in a smectic structure dispersed in a polymeric film can be carried out by the following operative steps. First, a display apparatus is heated to a high temperature such that the structure of the liquid crystal microdroplets is transformed first from a smectic phase to a nematic phase and then into an isotropic phase. The liquid crystal microdroplets appear transparent in their isotropic phase. The liquid crystal microdroplets are then cooled from such high temperature down to a predetermined temperature in an electric field having sufficient intensity. The electric field is then removed. The molecules in the liquid crystal microdroplets remain aligned with their molecular axes parallel to the electric field such that the liquid crystal droplets appear transparent for a sufficiently long period of time even after the removal of the electric field.

This memory effect may be erased when desired by simply heating the liquid crystal to its isotropic state and then cooling to its smectic state without the application of the electric field.

BRIEF DESCRIPTION OF THE DRAWINGS

Other objects, features and advantages of the present invention will become apparent upon consideration of the specification and the appendant drawings, in which.

DETAILED DESCRIPTION OF THE PREFERRED EMBODIMENT

Figure 1:
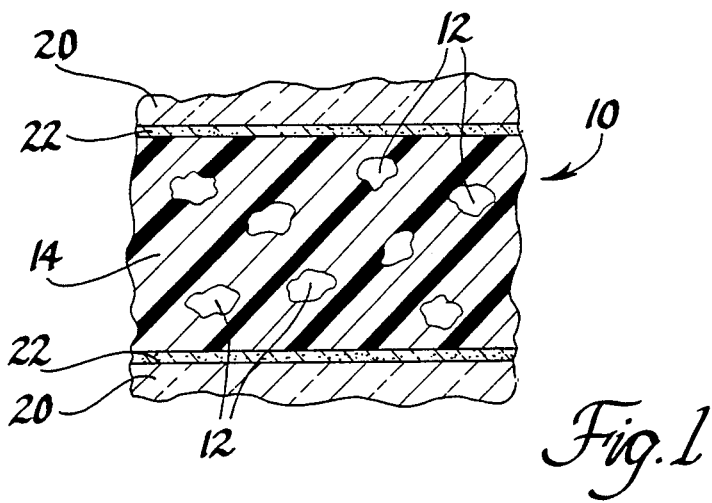
FIG. 1 is a schematic showing a cross-sectional view of a liquid crystal system in which liquid crystal microdroplets are dispersed in a polymer matrix.

Referring initially to FIG. 1 where a schematic of a cross-sectional view of a dispersed microdroplet liquid crystal film 10 is shown. In this light modulating liquid crystal film 10, microdroplets 12 of a liquid crystal material are dispersed in a synthetic resin matrix material 14 such as that of a thermoset polymer. In the present invention, the liquid crystal material we have used is 4-n-octyloxy-cyanobiphenyl. The synthetic resin matrix material we used is a thermoset epoxy commercially available from Devcon Corp. under the tradename of Devcon-5. It is a standard diglycidyl ether from bisphenol A and epichlorohydrin having the structure of

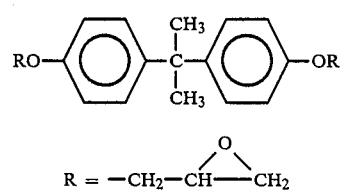

cured by a mixture of two catalysts,

75%  HO—CH$_2$—C—(CH$_2$OR)$_3$,

-continued
R = —(CH₂CH(CH₃)O)₁.₃CH₂CH(OH)CH₂SH, and

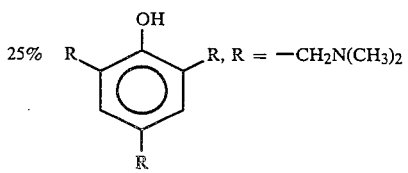

25% R, R = —CH₂N(CH₃)₂

The liquid crystal material and the resin matrix material are mixed together by hand stirring. The mixture is then placed and cured between two glass plates 20 (FIG. 1) which had been previously coated with transparent indium-tin-oxide electrodes 22. The curing conditions are 15 minutes at 70° C. We have also cured the mixture at room temperature for a longer period of time, i.e., one hour.

The smectic phase is a highly ordered phase which exists in many liquid crystal materials. Normally it spans a temperature range lying below that of the nematic phase which, in turn, lies below the isotropic phase. If a smectic liquid crystal material is heated through the nematic phase into the isotropic phase and allowed to cool back to the smectic phase in the absence of an applied electric field, the smectic material will usually assume a focal conic texture which strongly scatters light. The liquid crystal will then appear cloudy. If, however, a sufficient strong electric field is applied to the liquid crystal while it cools from the isotropic to the smectic phase, the liquid crystal molecules will tend to align themselves with their molecular axis parallel to the field and the material will appear transparent. This alignment and the resulting transparency will remain even after the field is removed.

In our liquid crystal, the smectic phase lies in the temperature range between 54.5° C. to 67° C., the nematic phase between 67° C. and 80° C., and the isotropic phase above 80° C. We heated the film into the isotropic phase and cooled it into the smectic phase while applying a 320 volt rms, 200 Hz voltage. The equipment we have employed is a Wavetek function generator (Model 187) whose voltage output was amplified with a Krohn-Hite amplifier (Model 7500 from 10 volts to 320 volts. The voltages were applied through the transparent electrodes 22 (FIG. 1) coated on the inside of the glass plates 20.

Figure 2:
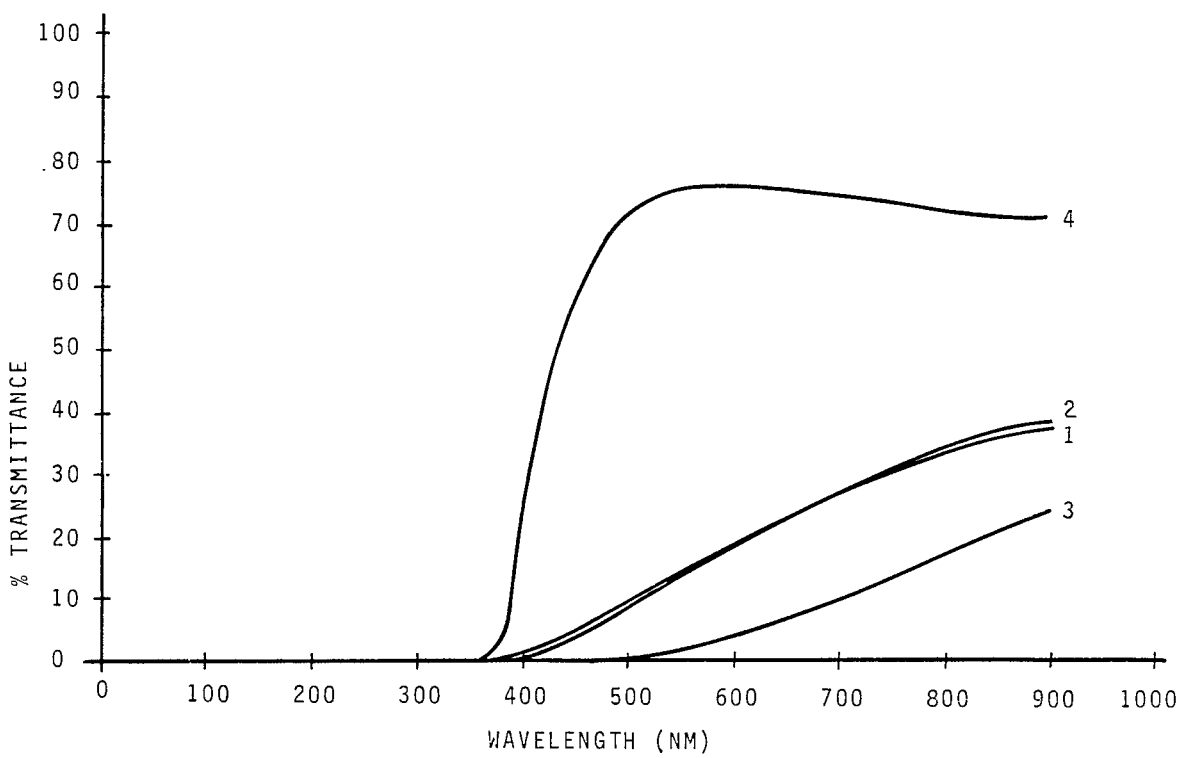
FIG. 2 is a graph showing the effect of electric field applied during cooling stage of the liquid crystal on the light transmittance.

The room temperature transmittance spectrum of our liquid crystal film after cooling in the electric field is shown in FIG. 2, as curve 1. The transmittance spectrum recorded after leaving the film at room temperature for 15 hours is shown in FIG. 2, curve 2. These two curves clearly show the memory effect in that there is no significant degradation in transparency after 15 hours. The liquid crystal film was then heated to the isotropic phase and cooled in the absence of voltage. The film became noticeably white (or opaque) during cooling. The transmittance spectrum of this film is shown in FIG. 2, curve 3. A significant decrease in the light transmittance due to scattering is evident. Finally, curve 4 of FIG. 2 shows the transmittance spectrum of the film heated into its isotropic state. It is seen that the transmittance in the isotropic state is significantly higher than that in the smectic state.

While FIG. 2 contains data obtained on a liquid crystal film cooled under a 300 volt rms, 200 Hz voltage, we have studied other liquid crystal film under various other voltage conditions. It is our recommendation that a suitable voltage range and frequency range to be used are 30 to 300 volts and 30 to 30,000 Hz. We have also discovered that the liquid crystal film would remain significantly transparent even after 100 hours.

While our invention has been described in terms of a specific embodiment, it will be appreciated that other embodiments could readily be adapted by one skilled in the art. Accordingly, the scope of our invention is to be considered limited only by the following claims.

The embodiments of the invention in which an exclusive property or privilege is claimed are defined as follows:

1. A method to create memory effect in a display apparatus using an optically responsive film containing liquid crystal microdroplets having molecules arranged in a smectic structure at a predetermined temperature dispersed in a film of a thermoset polymer, said smectic liquid crystal appears opaque at said predetermined temperature transforms into a nematic structure and then into an isotropic structure upon heating from said predetermined temperature to a higher temperature, said method comprising the steps of:
   (1) heating said liquid crystal microdroplets from said predetermined temperature to a higher temperature such that the structure of said liquid crystal is transformed first from said smectic phase to a nematic phase and then into an isotropic phase, said liquid crystal microdroplets appear transparent in their isotropic phase,
   (2) cooling said liquid crystal microdroplets from said higher temperature down to said predetermined temperature in an electric field having a minimum intensity of 60 volts rms at 200 Hz,
   (3) removing said electric field, whereby molecules in said liquid crystal microdroplets remain aligned with their molecular axes parallel to said electric field such that said liquid crystal microdroplets appear transparent for a minimum of fifteen hours after the removal of said electric field.

* * * * *